(No Model.)
C. H. MORGAN.
GEAR WHEEL.
No. 379,022. Patented Mar. 6, 1888.
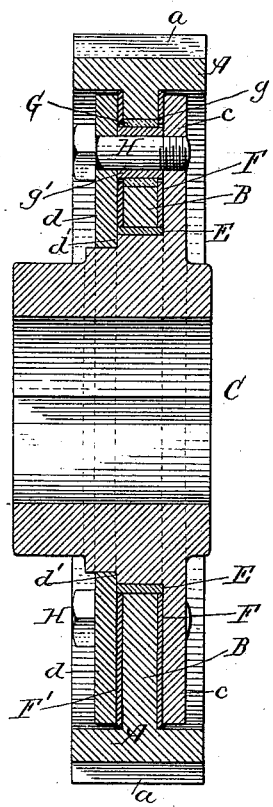
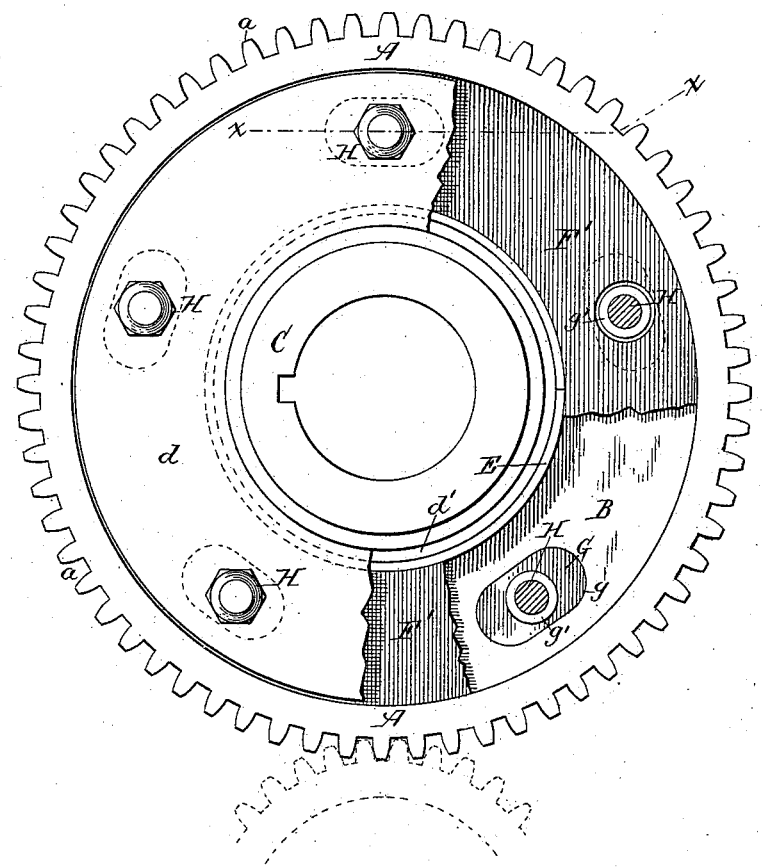
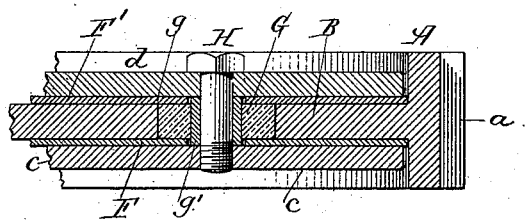

UNITED STATES PATENT OFFICE.

CHARLES H. MORGAN, OF BUFFALO, NEW YORK.

GEAR-WHEEL.

SPECIFICATION forming part of Letters Patent No. 379,022, dated March 6, 1888.

Application filed November 7, 1887. Serial No. 254,493. (No model.)

*To all whom it may concern:*

Be it known that I, CHARLES H. MORGAN, of Buffalo, in the county of Erie and State of New York, have invented new and useful Improvements in Gear-Wheels, of which the following is a specification.

This invention relates to that class of gear-wheels in which the toothed rim is made separate from the hub supporting the same, and in which the toothed rim is supported on the hub in such manner as to be capable of a limited movement thereon.

The object of my invention is to produce a reliable and inexpensive gear-wheel of this character, which is practically noiseless in its operation, and whereby front or back lash is prevented.

The invention consists of the improvement which will be hereinafter more fully set forth, and pointed out in the claims.

In the accompanying drawings, Figure 1 is a cross-section of my improved gear-wheel. Fig. 2 is a side elevation showing a portion of the clamping-ring and non-sonorous filling-ring broken away, so as to expose a portion of the flange of the toothed rim. Fig. 3 is a horizontal section in line *x x*, Fig. 2.

Like letters of reference refer to like parts in the several figures.

A represents the rim of the wheel, provided on its periphery with gear-teeth *a*, and B represents an annular flange formed on the inner side of the rim A.

C represents the hub, provided near one end with a collar or flange, *c*, which extends outwardly on one side of the rim-flange B.

*d* represents a removable collar or ring arranged on the opposite side of the flange B. The ring *d* fits snugly around the hub C and rests with its inner side against a shoulder, *d'*, on the hub C.

E represents a band or ring of rubber or other suitable flexible and non-sonorous material arranged in the bore of the flange B, and surrounding the hub C between the removable ring *d* and hub-flange *c*, and which serves to prevent contact of these parts and to center the gear-rim flange B on the hub C.

F represents a ring or lining of rubber or other suitable flexible and non-sonorous material surrounding the band E, and arranged between the adjacent faces of the collar *c* of the hub C and the flange B of the gear-rim A, and F' represents a similar ring or lining surrounding the opposite end of the band E and arranged between the adjacent faces of the gear-rim flange B and ring *d*.

G represents elongated blocks or cushions of rubber or other suitable elastic material arranged in elongated or enlarged openings *g*, formed in the gear-rim flange B.

*g'* represents stay-sleeves seated in openings formed centrally in the cushions G, and which fit snugly between the inner faces of the ring *d* and the hub-flange *c*.

H represents the bolts whereby the ring *d* and the gear-rim flange B are secured to the hub-flange *c*. The bolts H pass through openings formed in the ring *d* and fit snugly in the sleeves *g'*, and are secured in threaded openings formed in the hub-flange *c*. The stay-sleeves *g'* are made the same length as the distance between the shoulder *d'* and the inner face of the flange *c* of the hub C. By this construction the flange B is kept from being clamped so tightly between the ring *d* and hub-flange *c* as to prevent its free rotary movement between these parts.

My improved gear-wheel is especially desirable for use in connection with roller-mills in which the grinding or crushing rollers revolve with differential speeds, a small gear-wheel being secured to the shaft of the fast roller and a gear-wheel of larger diameter to the shaft of the slow roller. The material entering between the rollers creates a friction which has a tendency to cause both rollers to rotate with the same peripheral speed, thereby producing front lash of the gear-wheels, and consequent jars, which vibrate the rollers and the supporting-frame of the mill and interfere with the uniform grinding of the material. When the rotary speed of either the rim A or the supporting hub-flange *c* becomes suddenly increased, those parts of the elastic cushions G which were compressed in the normal working of the wheels expand uniformly upon being thus partially relieved from pressure and cause a corresponding acceleration in the hub-flange *c* or rim A, as the case may be, thereby retaining the teeth of the gear-wheels in close contact at all times and preventing front and back lash.

The elastic cushions G, lining-rings F F', and band E completely separate the metallic rim A from the metallic supporting hub-flange and connecting parts, and thereby deaden the noise caused by the contact of the gear-teeth. The cushions G and band E also form an elastic connection between the gear-rim flange and the hub and its flange, which permits the rim to yield toward the axis of the wheel, or eccentrically, in case nails or other hard objects enter between the wheels, or in case of an improper mounting of the wheels or imperfections in the gear-teeth, thereby avoiding injury to the latter.

My improved wheel can be produced at comparatively small expense, as the parts are so constructed that they can be easily put together or taken apart without requiring skilled labor. Should the gear-rim become broken it can be readily replaced by the person in charge simply removing the ring d and substituting a new rim for the broken one, and then again replacing the ring d, whereby tedious delays are avoided and a great saving of time is effected.

I claim as my invention—

1. The combination, with the wheel-rim having an internal flange and the hub having an external flange, one of said flanges being provided with enlarged bolt-holes, of fastening-bolts secured to one of said flanges and passing through the enlarged bolt-holes in the opposite flange, and elastic cushions arranged in said enlarged bolt-holes, substantially as set forth.

2. The combination, with the wheel-rim having an internal flange, B, provided with enlarged bolt-holes g, and a hub provided with an external flange, c, on one side of the flange B, of a ring, d, arranged on the opposite side of the flange B, bolts H, and elastic cushions G E F F', interposed between the contiguous metallic surfaces, substantially as set forth.

3. The combination, with the wheel-rim provided with an internal flange, B, and the hub having an external flange, c, of the ring d, fastening-bolts H, stay-sleeves g', applied to the bolts H, and elastic packings F F', arranged on both sides of the flange B, substantially as set forth.

4. The combination, with the wheel-rim provided with an internal flange, B, having enlarged openings g, and the hub having an external flange, c, of the ring d, fastening-bolts H, stay-sleeves g', elastic cushions G, arranged in the openings g around said sleeves, and the elastic packings E F F', arranged between the hub and its flange, the rim-flange, and the ring d, substantially as set forth.

Witness my hand this 4th day of November, 1887.

CHARLES H. MORGAN.

Witnesses:
 CARL F. GEYER,
 CHESTER D. HOWE.